(12) United States Patent
Ashmead (10) Patent No.: US 6,908,143 B2
(45) Date of Patent: Jun. 21, 2005

(54) ENERGY-ABSORBING STRUCTURE

(75) Inventor: Michael Ashmead, Woodhurst (GB)

(73) Assignee: Cellbond Limited, Huntingdon (GB)

( * ) Notice: Subject to any disclaimer, the term of this patent is extended or adjusted under 35 U.S.C. 154(b) by 0 days.

(21) Appl. No.: 10/372,062

(22) Filed: Feb. 20, 2003

(65) Prior Publication Data

US 2003/0127841 A1 Jul. 10, 2003

Related U.S. Application Data (63) Continuation of application No. PCT/GB02/01834, filed on Apr. 25, 2002, and a continuation of application No. 09/439,415, filed on Nov. 11, 1999, now Pat. No. 6,547,280.

(30) Foreign Application Priority Data

Nov. 21, 1998 (GB) .............................................. 9825488
Aug. 9, 1999 (GB) .............................................. 9918679

(51) Int. Cl.[7] ................................................. B60J 7/00
(52) U.S. Cl. .............................. 296/187.05; 296/146.6; 296/187.03; 206/521.1
(58) Field of Search ...................... 296/187.05, 187.03, 296/187.09, 187.11, 187.12, 146.6, 146.7; 188/377, 371; 29/897.2; 280/748

(56) References Cited

U.S. PATENT DOCUMENTS

| | | | | |
|---|---|---|---|---|
| 2,604,349 | A | | 7/1952 | Martinetz ..................... 293/70 |
| 3,495,474 | A | | 2/1970 | Nishimura et al. ............ 74/492 |
| 3,506,295 | A | | 4/1970 | Yancey ......................... 293/70 |
| 3,563,446 | A | * | 2/1971 | Lake et al. ............... 206/521.1 |
| 3,930,665 | A | | 1/1976 | Ikawa ......................... 280/751 |
| 3,964,208 | A | * | 6/1976 | Renner et al. ........... 296/146.6 |
| 4,081,123 | A | * | 3/1978 | Reifers ..................... 206/521.1 |
| 4,087,040 | A | * | 5/1978 | Bessett et al. ........... 206/521.1 |
| 4,890,877 | A | * | 1/1990 | Ashtiani-Zarandi et al. ........................ 296/146.7 |

(Continued)

FOREIGN PATENT DOCUMENTS

| | | | |
|---|---|---|---|
| DE | 4311978 | | 4/1994 |
| DE | 19814842 | | 10/1999 |
| DE | 199 47 245 | * | 4/2000 |
| DE | 19947245 | | 4/2000 |
| EP | 0022884 | | 1/1981 |
| EP | 0652388 | | 10/1994 |
| FR | 1541956 | | 10/1968 |
| FR | 2771355 | | 5/1999 |
| FR | 2784151 | | 4/2000 |
| GB | 1305489 | | 1/1973 |
| GB | 1319674 | | 6/1973 |
| GB | 1420929 | | 1/1976 |
| GB | 1424567 | | 2/1976 |
| GB | 1555152 | | 11/1979 |
| GB | 2 331 492 | * | 11/1997 |
| GB | 2331492 | | 5/1999 |
| JP | 3 45421 | * | 2/1991 |
| JP | 08198039 | | 8/1996 |
| WO | WO 82/02078 | | 6/1982 |
| WO | WO 00/31434 | | 6/2000 |
| WO | WO 02/088569 | | 11/2002 |

*Primary Examiner*—Kiran Patel
(74) *Attorney, Agent, or Firm*—Sheridan Ross P.C.

(57) ABSTRACT

A method of making an energy-absorbing structure in the form of a sheet having a pattern of alternating front and rear projections in front of and behind a median plane with each projection having an end face, a pitch region spaced from the end face, and a transition region therebetween including varying at least one parameter of the structure from the group consisting of local variation in sheet thickness in the pitch region, local variation in slope in the pitch region, geometry of the end face and geometry of the transition region, analyzing the energy absorption characteristics of the structure in response to the variation of the or each parameter, selecting the value of the or each parameter which gives a desired absorption characteristic and making a structure with the selected values of the or each parameter.

14 Claims, 9 Drawing Sheets

U.S. PATENT DOCUMENTS

| | | | | |
|---|---|---|---|---|
| 4,984,384 A | * | 1/1991 | Kaufmann | 47/9 |
| 5,067,367 A | | 11/1991 | Hashiba et al. | 74/552 |
| 5,098,124 A | * | 3/1992 | Breed et al. | 280/751 |
| 5,348,798 A | | 9/1994 | Berghuis et al. | 428/285 |
| 5,435,619 A | | 7/1995 | Nakae et al. | 296/189 |
| 5,700,545 A | | 12/1997 | Audi et al. | 428/131 |
| 5,732,801 A | | 3/1998 | Gertz | 188/377 |
| 5,749,193 A | | 5/1998 | Bucher | 52/506.06 |
| 5,830,548 A | * | 11/1998 | Andersen et al. | 206/524.3 |
| 5,833,304 A | | 11/1998 | Daniel et al. | 296/214 |
| 5,836,641 A | | 11/1998 | Sugamoto et al. | 296/214 |
| 5,857,734 A | | 1/1999 | Okamure et al. | 296/189 |
| 5,915,876 A | | 6/1999 | Barbazza | 404/6 |
| 6,012,764 A | * | 1/2000 | Seksaria et al. | 296/187.05 |
| 6,017,084 A | | 1/2000 | Carroll, III et al. | 296/189 |
| 6,199,942 B1 | | 3/2001 | Carroll, III et al. | 296/189 |
| 6,247,745 B1 | * | 6/2001 | Carroll et al. | 188/371 |
| 6,443,513 B1 | * | 9/2002 | Glance | 296/187.05 |
| 6,543,838 B1 | * | 4/2003 | Bertolini et al. | 296/146.6 |
| 6,547,280 B1 | * | 4/2003 | Ashmead | 296/187.03 |
| 6,550,850 B2 | * | 4/2003 | Laborie et al. | 296/146.6 |
| 6,601,886 B1 | * | 8/2003 | Thayer | 296/187.03 |
| 2002/0017805 A1 | | 2/2002 | Carroll, III et al. | 296/189 |
| 2004/0003974 A1 | * | 1/2004 | Ashmead | 188/377 |

* cited by examiner

ENERGY-ABSORBING STRUCTURE

CROSS REFERENCE TO RELATED APPLICATIONS

The present application is a continuation-in-part of U.S. patent application Ser. No. 09/439,415, filed Nov. 11, 1999, now U.S. Pat. No. 6,547,280, having the same title, and the present application and a continuation and also claims priority under 35 U.S.C. § 120 to PCT/GB02/01834 (designating the United States) having an international filing date of Apr. 25, 2002 and international publication number WO 02/088569 A1, published in English on Nov. 7, 2002. Both of these applications are incorporated herein in their entirety by this reference.

FIELD OF INVENTION

The present invention relates to an energy-absorbing structure for absorbing impact energy.

BACKGROUND ART

Energy-absorbing structures are widely used in vehicles such as motor cars to absorb energy should the vehicle be involved in an accident. In particular, energy-absorbing structures are used on the interior of the vehicle, for example behind the headlining of the vehicle, to absorb the energy of an occupant of the vehicle impacting the energy-absorbing structure during a motor vehicle accident. The intention is that the energy-absorbing structure absorbs the energy of impact so that the vehicle occupant is not killed or severely injured.

The energy absorption by an energy-absorbing structure may be characterised by a stress-deformation curve that plots the force of stress exerted by the structure as a function of the deformation. The stress-deformation curve may be measured for a variety of impact bodies impacting the energy-absorbing structure, and either statically or dynamically. In a dynamic test, the impact body is moving rapidly; in a static test the body moves slowly.

As taught in International application WO 00/31434, an energy-absorbing structure has an "egg-box" shape in which a sheet is formed to have front and rear projections. Stress-deformation curves for such structures exhibit a plateau "P" and this is achieved by appropriate selection of the angle of the sheet between the front and rear projections. The plateau "P" is intended to be below a predetermined level, in particular it may at a level sufficiently low that such force does not cause severe injury.

Though good results are achieved with such a component having a plateau in the stress-deformation curve, there remains a compelling need for improved occupant safety in motor vehicles.

DISCLOSURE OF INVENTION

According to a first aspect of the invention, there is provided a method of making an energy-absorbing structure in the form of a sheet having a pattern of alternating front and rear projections in front of and behind a median plane with each projection having an end face, a pitch region spaced from the end face and a transition (e.g. edge) region therebetween characterised by the steps of varying at least one parameter of the structure from the group consisting of local variation in sheet thickness in the pitch region, local variation in slope in the pitch region, geometry of the end face and geometry of the transition region, analysing the energy absorption characteristics of the structure in response to the variation of the or each parameter, selecting the value of the or each parameter which gives a desired absorption characteristic and making a structure with the selected values of the or each parameter.

Each projection may be manufactured to have the same or different parameter values. At least two or all parameters may be varied. The manufacturing may be by moulding, e.g. injection moulding, or pressing.

The geometry of the end face may be varied by forming an indentation therein. The indentation may be configured to encourage the formation of an inwardly rolling or travelling hinge deformation mechanism during deformation of the structure. Such a travelling hinge may encourage the projection to fold in on itself. The indentation may be conical or frustoconical and may be located centrally in the end face.

The geometry of the transition region may be varied to encourage an outwardly rolling or travelling hinge deformation mechanism as the respective projection deforms when absorbing impact energy. The transition region may thus have a sharp transition from the pitch region to the end face. A more gradual transition in the transition region would tend to encourage the formation of an inwardly travelling hinge. The pitch region may be at angle of at least 80 degrees or at least 85 degrees to the median plane and the end face may be substantially parallel to the median plane. The projections may be substantially cylindrical with only a slight end to end taper to facilitate injection moulding.

Local variations in sheet thickness or slope may be achieved by introducing at least one line or region of weakness into the pitch region of at least one projection. Lines or regions of weakness may be provided in all or some projections and may thus define lines or regions of weakness extending across the whole or part of the structure. Such structural lines of weakness may be parallel or non-parallel. The lines or regions of weakness may be introduced by integrally forming them with the structure, e.g. by moulding, or by introducing them after forming the structure, e.g. by cutting.

The or each line of weakness may be selected from the group consisting of a ridge or step in a surface of the pitch region, a groove in a surface of the pitch region, a series of holes extending through the pitch region and a slot extending through the pitch region.

Each line or region of weakness may give rise to preferential fold lines to develop in close proximity. The at least one line or region of weakness may thus be introduced into the pitch region to encourage buckling in the pitch region as the respective projection deforms when absorbing impact energy. For example, the at least one line or region of weakness may be contour-like. The at least one line or region of weakness may substantially encircle the projection or may extend around only part of the projection.

The at least one line of weakness may be a groove which may have a depth of approximately one-tenth of the thickness of each projection. In this way, deformation, in particular buckling, may be encouraged without substantially weakening the overall structure (e.g. reducing the threshold stress level where a plateau might occur in the stress-deformation curve). A pattern of grooves may be formed; the pattern may have grooves on both front and rear surfaces of the sheet. The grooves on opposite sides of the sheet may be staggered, i.e. offset relative to each other.

A plurality of lines of weakness may be provided on the at least one projection, for example to encourage a concertina effect in the sheet as the projection is compressed towards the median plane. The lines of weakness may be concentric or helical. The number of lines and their location may be adjusted as required. The spacing between adjacent lines of weakness in one projection may be less than 50 times (e.g. between 10 to 20 times) the thickness of the sheet forming the projection.

The at least one line of weakness may be formed by a slot which may extend radially outwards from a central axis of the projection and may have a width tapering away from the central axis. A plurality of slots may be introduced into the projection and may be spaced equally around the central axis. At least some of the slots may be parallel to each other. The at least one line of weakness may be formed by a series of holes which may extend around the circumference of a circle which may be centred on the central axis. The number of holes or slots and their location may be adjusted as required.

The structure may be designed to absorb impact during deformation in such a way as to provide a plateau at a predetermined level in the stress-deformation curve, i.e. the curve of stress normal to the median plane required to deform the sheet against increasing deformation. The or each line of weakness may extend the plateau in the stress-deformation curve by allowing the sheet to be compressed to a greater extent at the predetermined stress level than might otherwise be the case. This may be achieved by encouraging buckling or the formation of inwardly or outwardly travelling hinges.

Alternatively, the structure may be designed to absorb impact during deformation so that the structure has a stress-deformation curve such that for increasing deformation the stress rises to a peak and then falls away then falls away substantially until densification effects come into play. This may be achieved, for example, by introducing at least one line of weakness which extends radially from a central axis of the projection.

The structure may be designed to absorb impact during deformation in such a way as to tailor the stress-deformation curve for different impact angles. For example, the peak in the stress-deformation curve may occur for glancing impacts. The structure may nevertheless retain its structural integrity and strength.

According to a second aspect of the invention, there is provided an energy-absorbing structure comprising a sheet having a pattern of alternating front and rear projections in front of and behind a median plane with each projection having an end face, a pitch region spaced from the end face and a transition region therebetween characterised in that at least one line or region of weakness is formed in the pitch region of at least one projection, whereby a desired energy absorption characteristic is obtained.

The structure may comprise a plurality of lines or regions of weakness in some or all projections. The form of the or each line of weakness may be selected from the group consisting of a ridge or step in a surface of the pitch region, a groove in a surface of the pitch region, a series of holes extending through the pitch region and a slot extending through the pitch region.

The at least one region of weakness may be defined by a thinned region which may have a thickness less than half the thickness of the rest of the sheet.

The at least one line or region of weakness in the pitch region may encourage uniform or controlled buckling in the pitch region as the respective projection deforms when absorbing impact energy. For example, the or each line or region of weakness may substantially encircle the at least one projection. This may encourage the structure to absorb energy in such a way as to provide a plateau at a predetermined level in the stress-deformation curve and may extend the plateau in the stress-deformation curve.

Alternatively, the at least one line of weakness may extend radially outwards from a central axis of the at least one projection. This may result in a stress-deformation curve such that for increasing deformation the stress rises to a peak and then falls away substantially until densification effects come into play.

According to another aspect of the invention, there is provided an energy-absorbing structure comprising a sheet having a pattern of alternating front and rear projections in front of and behind a median plane with each projection having an end face, a pitch region spaced from the end face and a transition region therebetween characterised in that at least one of the end face and the transition region are configured to encourage travelling hinge deformation patterns when the sheet deforms, whereby a desired energy absorption characteristic is obtained.

The transition region may have a sharp transition from the pitch region to the end face. The pitch region may be at an angle of at least 80° or at least 85° to the median plane and the end face may be substantially parallel to the median plane. The projections may be substantially cylindrical with only a slight end to end taper to facilitate injection moulding.

The end face may be formed with an indentation to encourage the travelling hinge deformation mechanism. The indentation may be generally conical or frustoconical and may be located centrally in the end face.

In each embodiment, the energy-absorbing structure is preferably sacrificial, i.e. deforms permanently when absorbing energy from an impact. In other words plastic not elastic deformation occurs. The sheet may absorb impact by bending in the pitch region and/or by forming a travelling hinge when deforming.

The sheet may comprise a material which deforms plastically, including aluminium or plastics. The sheet may be moulded or pressed from a blank to form the structure. The material of the sheet, the thickness of the sheet and the density of projections over the area of the sheet may be determined such that the plateau level is at a level of stress that does not cause serious injury or that avoids death when a living human body part such as a head impacts the energy-absorbing sheet.

In particular, the energy absorbing structure may be an energy-absorbing vehicle component for reducing the risk of injuries. Thus, according to another aspect of the invention, there is provide a vehicle comprising an energy absorbing structure as hereinbefore described. The vehicle may have a headlining and the component may be mounted behind the headlining.

In each embodiment, the projections may be arranged to alternate in two directions in the median plane and to cover at least 80% of the sheet, preferably without substantial flat areas therebetween. The pitch region is inclined at an angle from the median plane of the sheet with the pitch angle being determined at the position of maximum steepness in the pitch region. The position of maximum steepness may occur midway between the centres of adjacent front and rear projections. The angle may be 25 to 89 degrees, in particular 25 to 60 degrees. Each projection may be hollow and the end face may be flat and may extend parallel to the median plane. The median plane may be flat or curved.

The structure may comprise a skin on one or both sides of the sheet. The or each skin may be attached to the sheet, for example, using polyurethane adhesive, such that lateral movement of the skin against the sheet is possible during impact.

BRIEF DESCRIPTION OF DRAWINGS

For a better understanding of the invention specific embodiments will now be described, purely by way of example, with reference to the accompanying drawings in which.

Figure 1A:
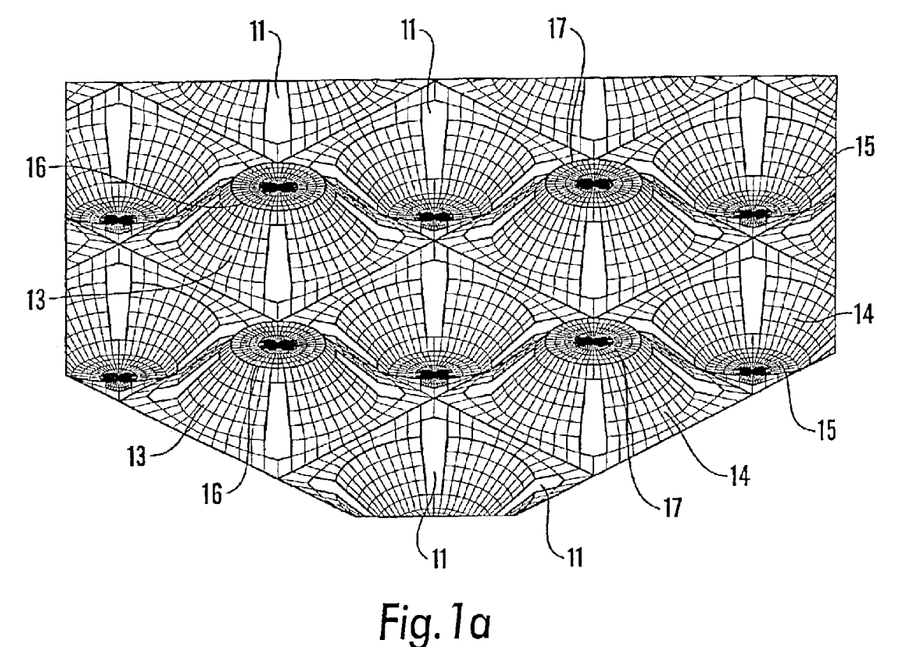
FIGS. 1a and 1b are respectively perspective and plan views of a structure according to a first aspect of the invention.
Figure 1B:
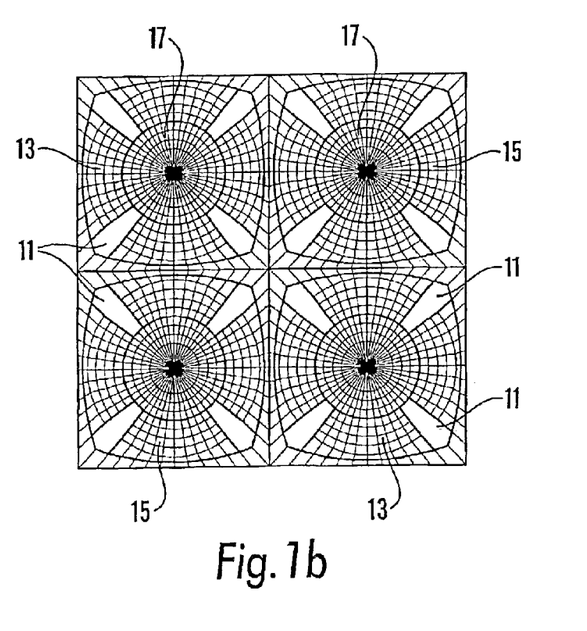

FIGS. 1a and 1b show a structure in the form of a non-planar member having a pattern of alternating front projections 13 and rear projections 15, without substantial flat areas therebetween. The projections are frustoconical and hollow with substantially flat end faces 17, pitch regions 14 spaced from the end faces and transition (edge) regions 16 between the end faces 17 and adjacent pitch regions 14. The pitch region is inclined at an angle A of approximately 45 degrees to a median plane which is a notional plane which locally represents the position of the non-planar member with the projections smoothed out. The flat end faces 17 are parallel to the median plane.

Local variations in the wall thickness of each projection in the pitch region are achieved by providing four slots 11 in the pitch region of each projection. The four slots 11 extend radially from and are equally spaced around the flat end faces to form two pairs of parallel slots. The slots extend through the wall of the pitch region and the width of each slot decreases slightly towards the flat end of each projection. As shown more clearly in FIG. 1b, the slots 11 provide two sets of mutually perpendicular lines of weakness extending across the whole structure.

Figure 2A:
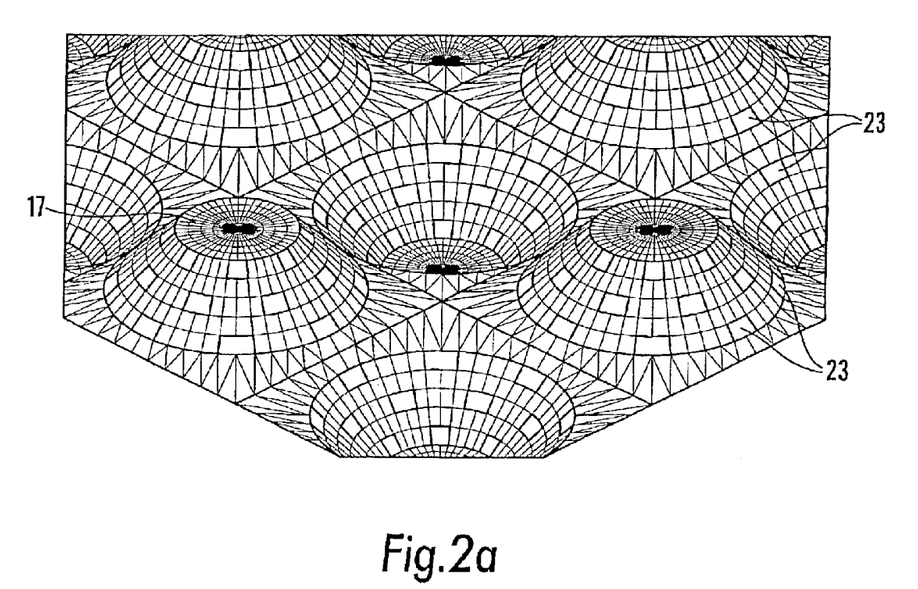
FIGS. 2a and 2b are respectively perspective and plan views of a structure according to second aspect of the invention.
Figure 2B:
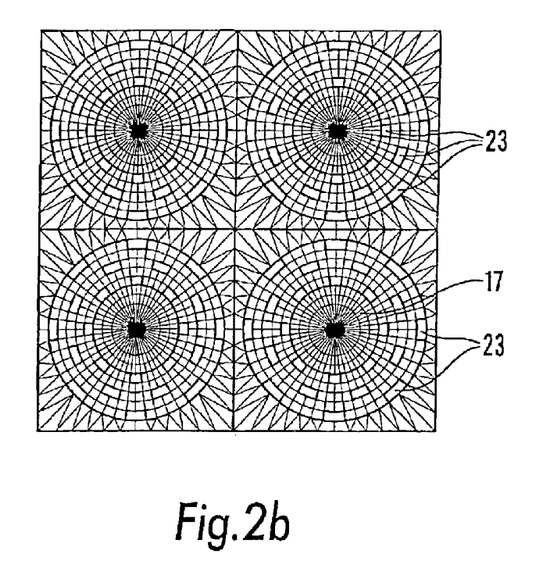

FIGS. 2a and 2b shows a structure which is generally similar to that of FIGS. 1a and 1b and thus features in common have the same reference number. The wall thickness of each projection in the pitch region is varied by providing a pattern of several, i.e. 24, small holes 23 in the pitch region of each projection. The holes are arranged along the circumference of three circles which are concentrically aligned with the flat end. A set of eight equally sized holes are spaced equidistantly along each circumference. The holes extend through the wall of the pitch region and the size of each set of holes increases with the radius of the circle. Each projection thus has circular lines of weakness.

Figure 3:
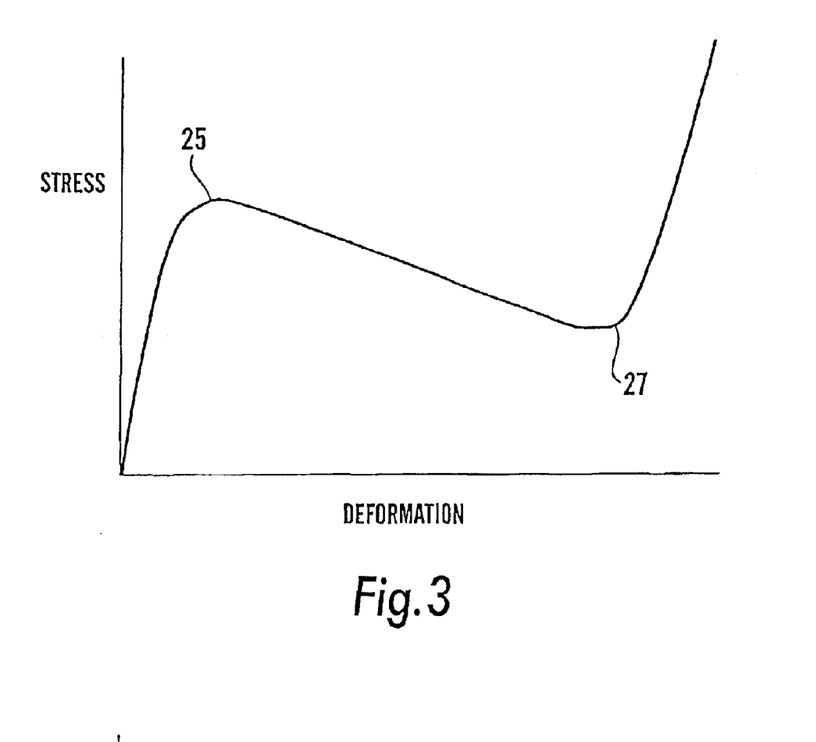
FIG. 3 is a graph of stress against deformation for the structure of FIGS. 1a and 1b.

The structure of FIGS. 1a and 1b has a different stress-deformation curve to that of a similar structure without slots. In particular, a glancing impact along the line of the slots gives rise to a stress-deformation curve of the type shown in FIG. 3 with an initial peak 25 followed by an downwards incline (or slope) at a slightly lower level of stress than the peak. The incline slopes down to a short plateau 27 after which densification effects come into play and the stress begins to rise again. Thus the stress rises to a peak then falls away substantially before densification effects come into play.

Figure 4:
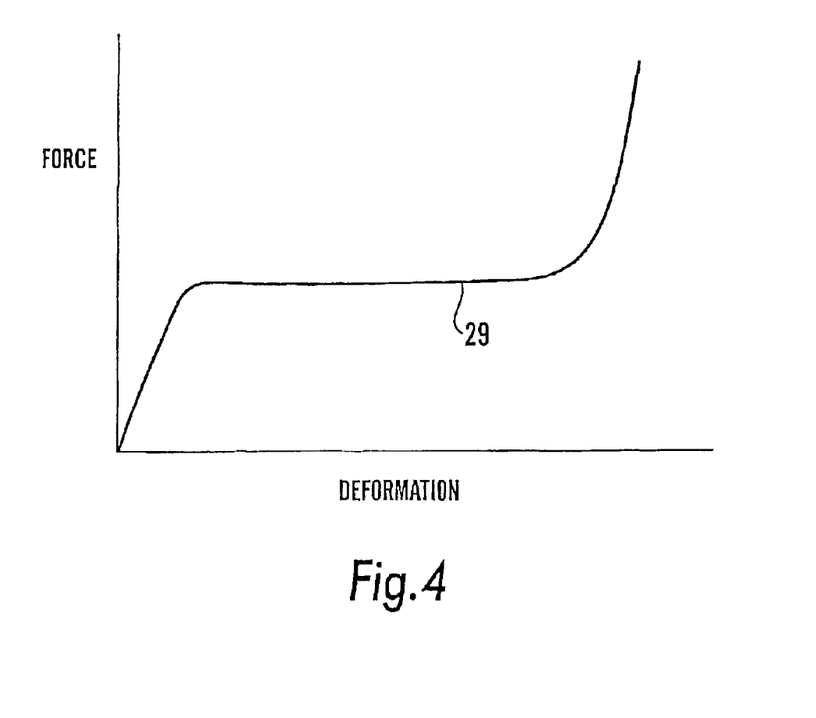
FIG. 4 is a graph of force against deformation for the structure of FIGS. 1a and 1b.

The corresponding force-deformation curve is shown in FIG. 4. There is a long plateau 29 with the force only rising again for large deformations after the structure is already substantially crushed (i.e. so called densification effects).

If the structure of FIGS. 1a and 1b is used as an energy absorbing component, e.g. in vehicle headlining, in the event of a vehicle occupant hitting the energy absorbing component, injury to the occupant may be reduced. In particular injuries to a head may be reduced as described below. Impact by a head may be mimicked using a rounded form, e.g. part of a sphere of diameter between 15 cm and 30 cm. When such a rounded form impacts a structure, the area of contact will initially be small and will increase as the round form continues to impact and the structure continues to deform. Thus, the force on the round form would increase with deformation if the stress were constant. By using a structure with slots, the force on the round form quickly reaches a plateau which should be at a level which does not cause serious injury.

Figure 5:
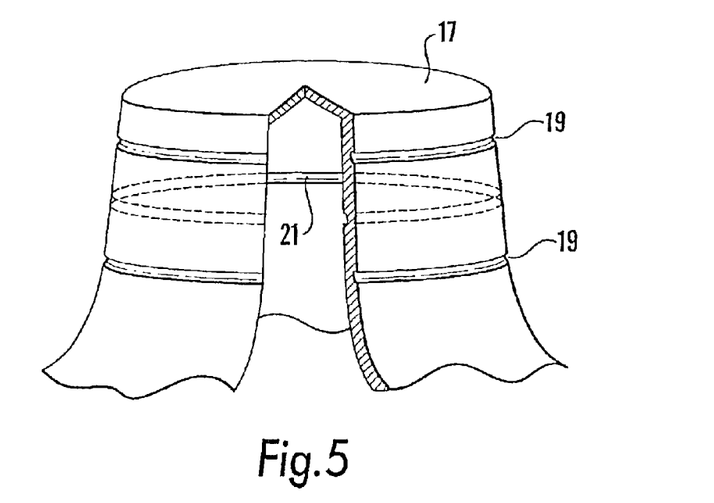
FIG. 5 is a cut-away side view of a section of a projection of a structure according to another aspect of the invention.

The holes used in FIGS. 2a and 2b are designed to encourage buckling in the pitch region. A similar effect may be obtained by altering the thickness of each projection in its pitch region as shown in FIG. 5. Grooves 19, 21 in the form of rings extending around the surface of each projection are concentrically aligned with the flat end 17. Grooves 19 on the outer surface are alternated with grooves 21 on the inner surface. The wall thickness of the projection is approximately 1 mm and the depth of the grooves approximately 0.1 mm. Thus, the grooves have a depth which is approximately one-tenth of the wall thickness of the projection.

Figure 6A:
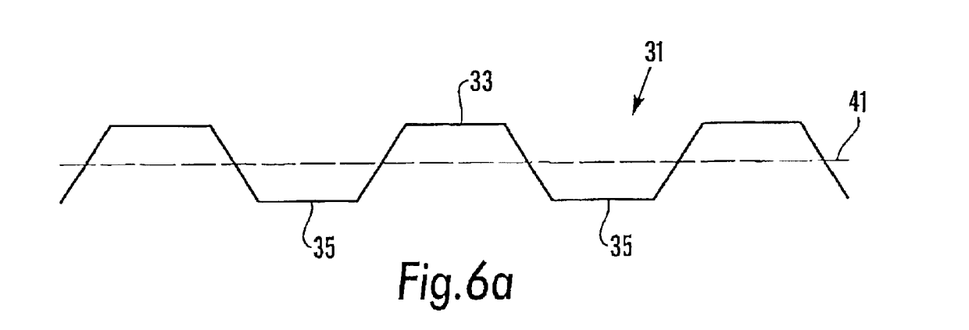
FIGS. 6a, 6b and 6c show side views of the structure of FIG. 5 illustrating compressive deformation of the structure.
Figure 6B:
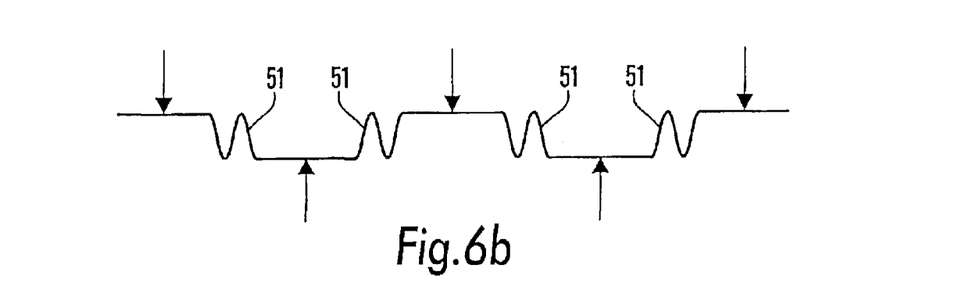
Figure 6C:
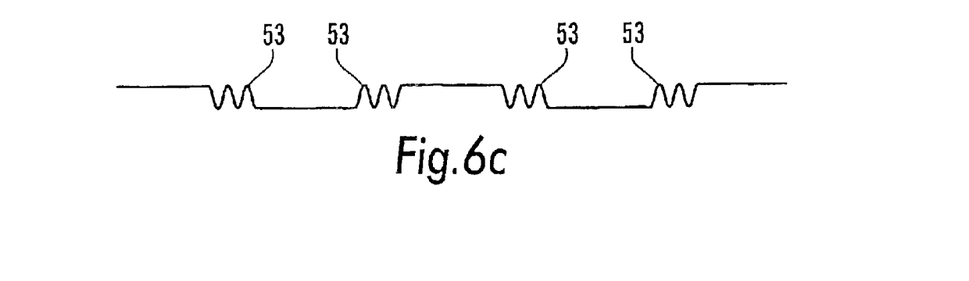

The buckling deformation process which is encouraged by the use of concentric lines of weakness is schematically illustrated in FIGS. 6a, 6b and 6c. FIG. 6a shows the non-planar member 31 before compression. As shown in FIG. 6b, initially, the non-planar member 31 deforms by forming substantially S-shaped bends 51 in the pitch region. As shown in FIG. 6c, as the non-planar member 31 deforms further the grooves act as hinge areas which encourage the projections 33, 35 to fold-back on themselves on impact. The S-shaped bends 51 of FIG. 6b become double-S-shaped bends 53. Eventually, the projections 33,35 may collapse completely being substantially aligned with and contained in the median plane 41, by the impact. The non-planar member 31 is deformed permanently when absorbing impact energy.

Figure 7:
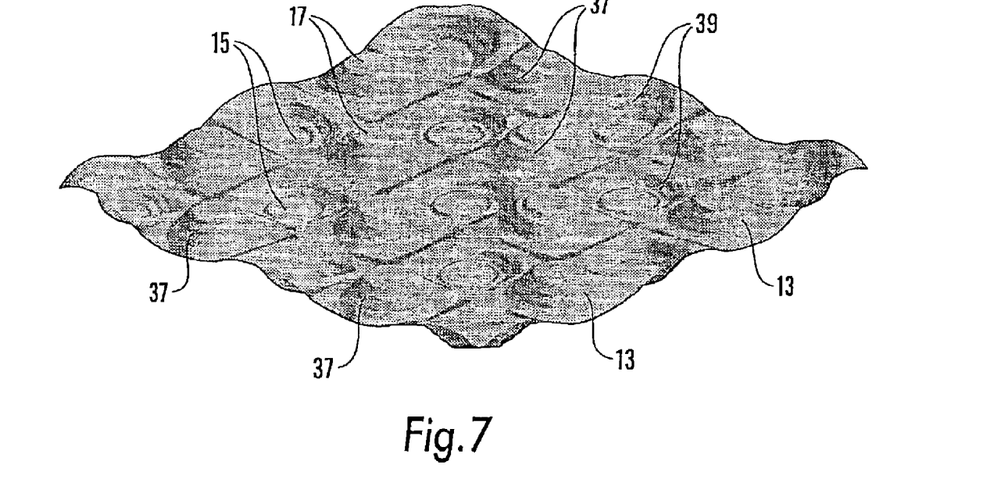
FIG. 7 shows a perspective view of a structure according to another aspect of the invention.
Figure 8:
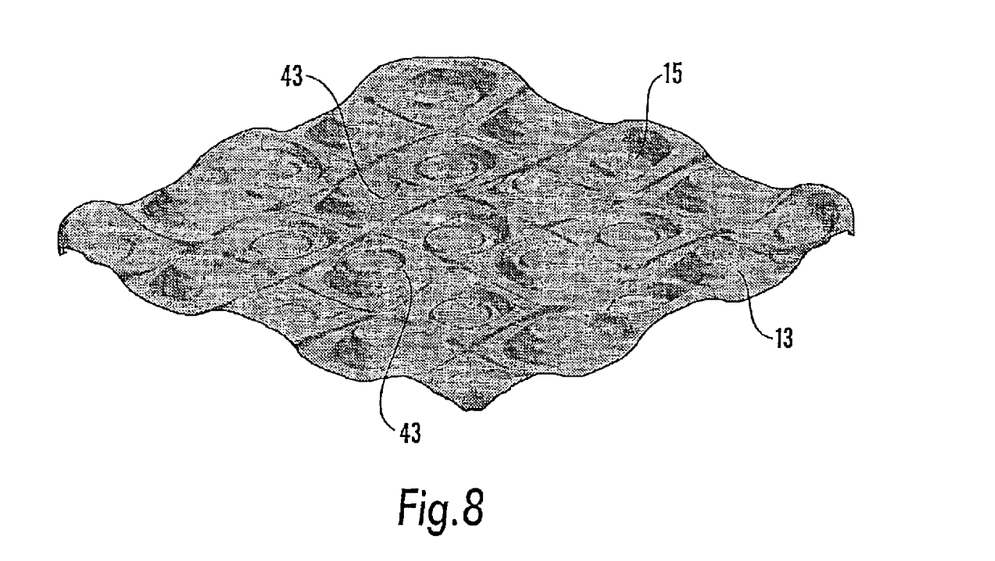
FIG. 8 is a perspective view of the structure of FIG. 7 during impact.

FIGS. 7 and 8 show another structure according to the invention which is also designed to encourage buckling. The slope of each projection in the pitch region is varied by providing three ridges or steps 37 protruding from an external face of each front and rear projection 13,15. The use of such ridges provides local variation in the slope of the pitch region. The interior faces of each projection have a corresponding profile, with steps or ridges 39. The ridges are circular and concentrically aligned with the end face 17 of each projection.

As shown in FIG. 8, the ridges and grooves encourage the formation of bends 43 in the pitch region whereby the top ends of each front and rear projection 13,15 are brought closer together. The effect is not equal across the whole of the structure since the structure is contoured, for example, to fit inside the lining of a vehicle.

Figure 9:
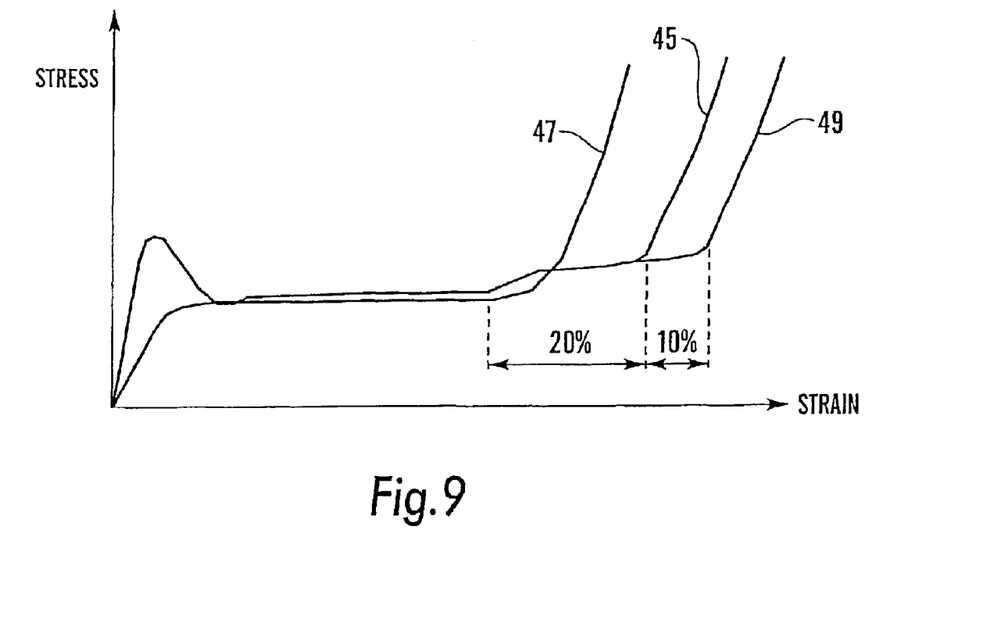
FIG. 9 is a graph of stress against strain comparing the structure of FIG. 10 with other structures.

FIG. 9 shows the stress-strain graphs 45,47,49 for the structure of FIGS. 7 and 8, a similar standard structure without any grooves or ridges and a structure having five concentric ridges in each projection. Each graph shows a plateau region which is extended by approximately 20% by the use of the structure of FIGS. 7 and 8 and by an extra 10% by using a structure having five ridges. Thus concentric lines of weakness which encourage buckling provide an extension to the plateau in the stress-strain graph. The graphs for the structures with ridges also exhibit a sharp peak which quickly falls away to the plateau region.

Figure 10:
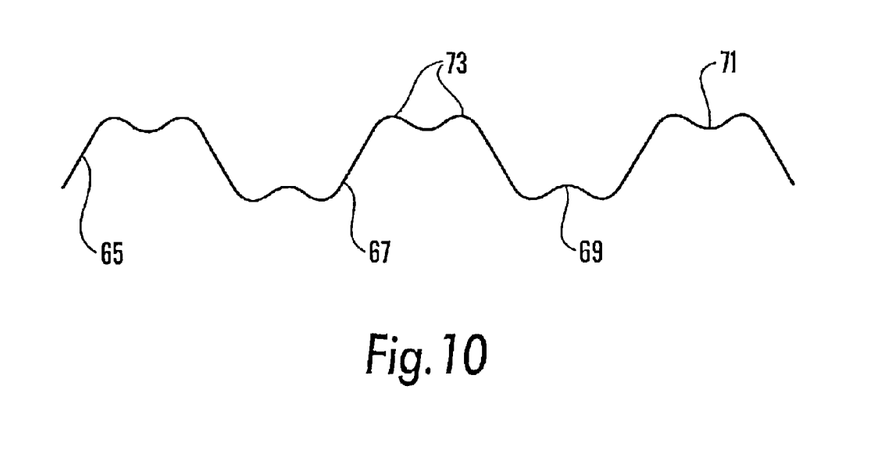
FIG. 10 shows a side view of a structure according to the invention illustrating an alternative compressive deformation of the structure.

FIG. 10 shows a schematic side view of a structure which is designed to encourage the formation of a travelling hinge which is a different deformation process to buckling. Each front and rear projection 65, 67 is formed with a generally circular indentation 69 on its top surface. The centre 71 of each indentation forms the travelling hinge on compression. The travelling hinge is defined by a circumferential knuckle 73 which extends around the edge of each flat top. As the member deforms further the projection is gradually folded in on itself about the hinge until eventually, the projections may be completely flattened to the median plane. Deformation by buckling in the pitch region may occur simultaneously with deformation by a travelling hinge.

Figure 11:
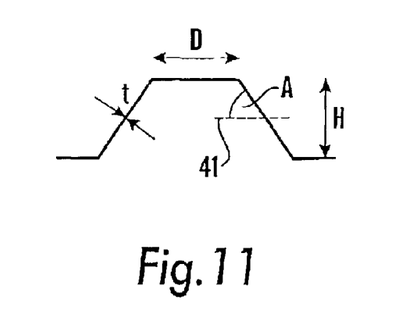
FIG. 11 is a side view of a structure according to another aspect of the invention.
Figure 12:
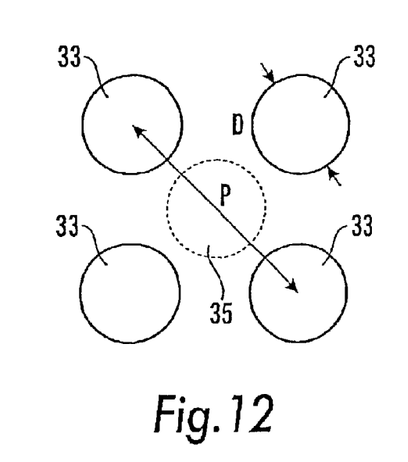
FIG. 12 is a cross-section of a projection of a structure.

FIGS. 11 and 12 illustrate a generalised non-planar member 31 which may be used in any preceding embodiment. The non-planar member 31 has a pattern of alternating front projections 33 and rear projections 35 both of which are frustoconical with substantially flat end faces 37. The projections have a wall thickness t, a height H, a top face having a diameter D and a pitch region inclined at an angle A to the median plane. The interpitch P is the distance between two projections extending in the same direction from the median plane and is measured across a projection extending in the opposition direction.

The characteristics of the pattern and the projections may be selected from the following table although geometry 1 is particularly suited to each of the previous embodiments:

| | Height H (mm) | Diameter D (mm) | Interpitch P (mm) | Angle A (degrees) |
|---|---|---|---|---|
| Geometry 1 | 20 | 15 | 70 | 45 |
| Geometry 2 | 10 | 9 | 35 | 40 |
| Geometry 3 | 20 | 12.5 | 50 | 32 |
| Geometry 5 | 10 | 12.5 | 50 | 51.34 |
| Geometry 6 | 10 | 12.5 | 30 | 14 |
| Geometry 7 | 30 | 10 | 50 | 26.5 |
| Geometry 8 | 15 | 12.5 | 50 | 40 |
| Geometry 9 | 7.5 | 3.125 | 12.5 | 22.6 |
| Geometry 10 | 12.5 | 12.5 | 50 | 45 |

-continued

| | Height H (mm) | Diameter D (mm) | Interpitch P (mm) | Angle A (degrees) |
|---|---|---|---|---|
| Geometry 11 | 10 | 7.5 | 35 | 45 |
| Geometry 12 | 15 | 11.25 | 52.5 | 45 |
| Geometry 13 | 25 | 18.75 | 87.5 | 45 |
| Geometry 14 | 30 | 22.5 | 105 | 45 |

Thus, the height of each projection may vary from 7.5 mm to 30 mm and the diameter of each flat end face may vary from 3.125 mm to 22.5 mm. The interpitch may vary between 12.5 mm and 105 mm. The angle may vary between 14 and 51.34 degrees. The angle is measured relative to the median plane 41 which is the notional plane which locally represents the position of the non-planar member with the projections smoothed out. The sheet may have a thickness of 0.5 mm to 0.7 mm.

The use of a bi-directional array of alternating front and rear projections is crucial since this provides isotropic behaviour regardless of the impact direction. The array absorbs energy from oblique impacts in either of two perpendicular directions in the energy absorbing layer, in addition to energy from vertical impacts. The front projections are supported by corresponding rear projections which provides additional stability. Furthermore, each individual front or rear projection behaves individually and thus a local impact causes a local and not substantial deformation of the sheet. The sheet also has acceptable energy absorbing properties on the edges of the projections.

Figure 13:
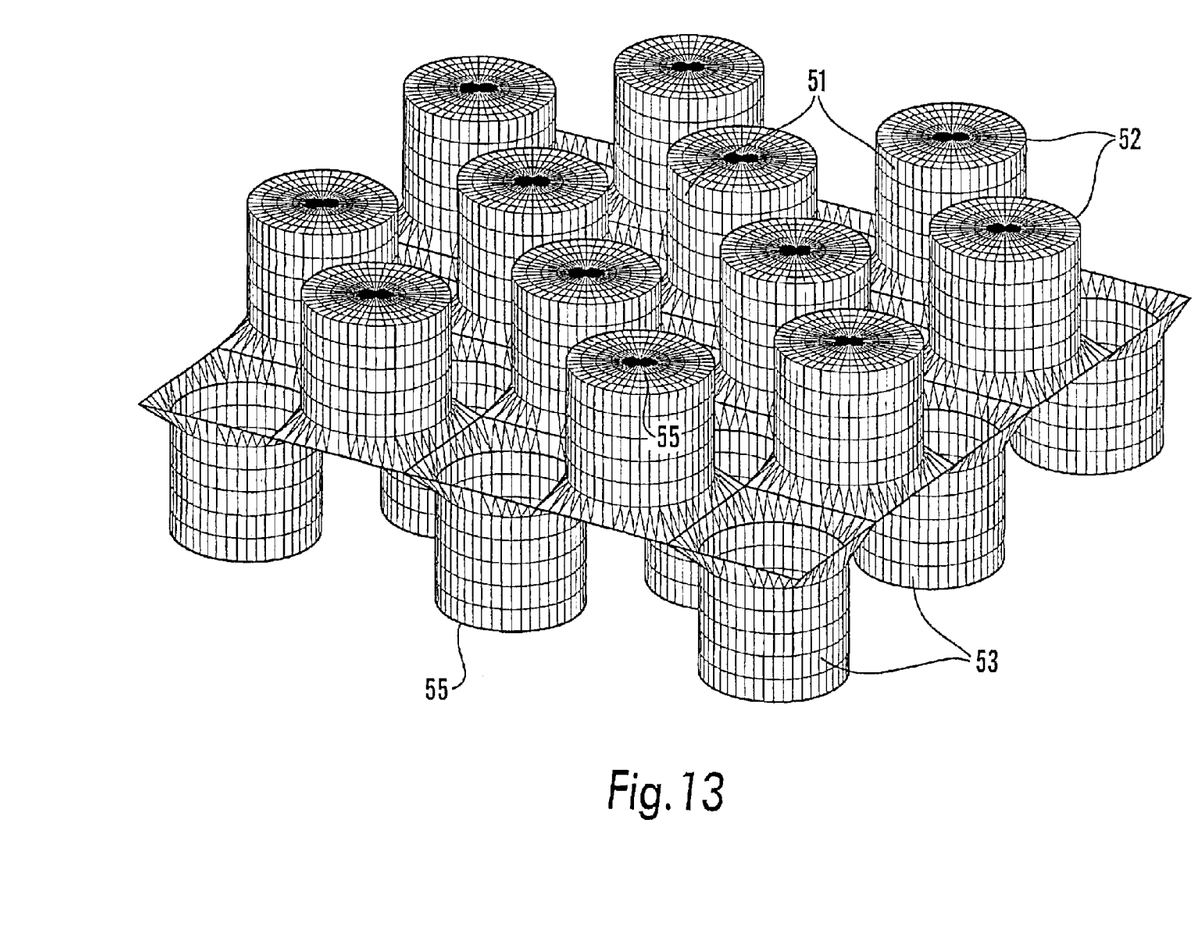
FIG. 13 shows a perspective view of a structure according to another aspect of the invention.

By appropriate selection of the material and/or other properties of the member it is possible to increase the angle A, i.e. angle of inclination of the pitch region to the median plane to 89 degrees. Such a structure is illustrated in FIG. 13 which shows an alternating pattern of front and rear projections 51,53 which are hollow and generally cylindrical with flat end faces 55. The projections have a slight end to end taper. By the use of projections having a pitch region which is generally perpendicular to the end face 55, a large depth may be filled more efficiently. There is a sharp transition in the transition region 52 between the pitch region and the end face.

Figure 14:
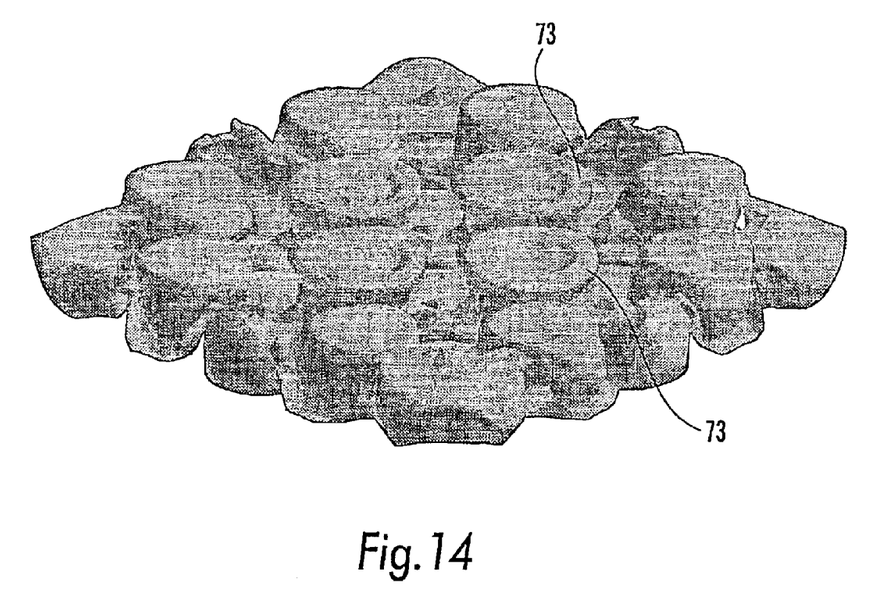
FIG. 14 is a perspective view of the structure of FIG. 13 during impact.
Figure 15:
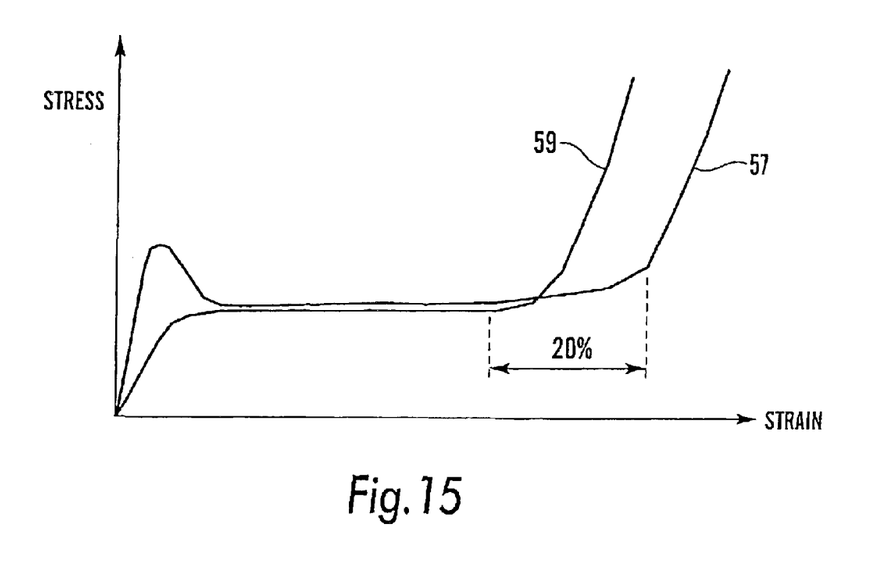
FIG. 15 is a graph of stress against strain comparing the structure of FIG. 9 with another structure.

As shown in FIG. 14, the structure deforms under impact by forming a travelling hinge 73 in the pitch region but in contrast to the travelling hinge encouraged by the embodiment of FIG. 10, the pitch region bends outwards rather than inwards. The travelling hinge travels down the outer edge of each projection. FIG. 15 shows the stress-strain graphs 57,59 for the structure of FIG. 13 and a standard structure having geometry 1. The graph shows that the plateau region is extended by approximately 20% by the use of the structure of FIG. 13.

Figure 16A:
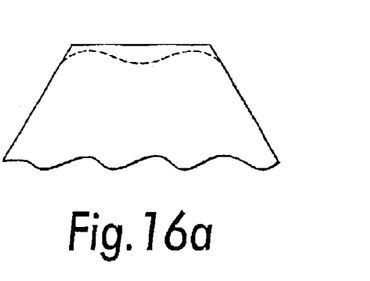
FIGS. 16a, 16b and 16c are schematic cross-sections of a projection illustrating the parameters which may be varied.
Figure 16B:
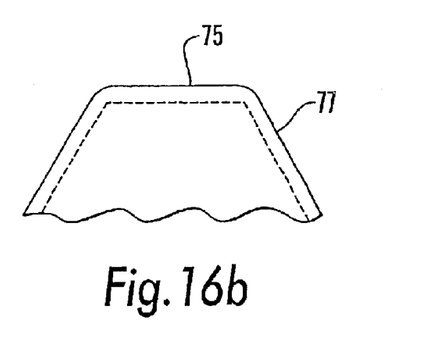
Figure 16C:
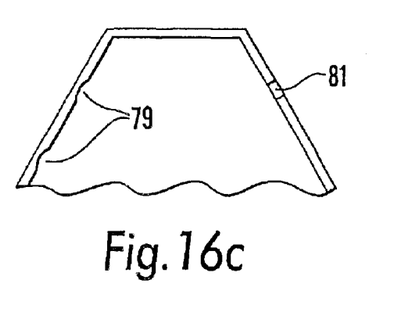

Thus, in summary, each of the above embodiments is linked by the concept of adjusting one of the following parameters, namely geometry of the end face, geometry of the transition region or local variations in slope or thickness in the pitch region to achieved a desired energy absorption. FIG. 16a shows two variations in end face geometry, namely flat (shown in solid lines) or dimpled (shown in dashed lines). FIG. 16b shows two variations in geometry of the transition region, namely a sharp transition in the transition region (shown in dotted lines) or a more gentle transition in the transition region (shown in solid lines). For the transition region having a sharp transition, the end face 75 and pitch region 77 meet substantially at a right angle to each other. FIG. 16c shows two variations in thickness in the pitch region, namely thinned regions 79 which have a wall thickness is less than that of the rest of the pitch region and a hole 81 extending through the side wall of the projection. The thickness of the wall may thus be zero in some regions.

What is claimed is:

1. An energy-absorbing structure comprising:
    a sheet having a pattern of alternating front and rear projections in front of and behind a median plane, the projections being arranged to alternate in two directions in the median plane wherein each projection comprises:
    an end face;
    a pitch region spaced from the end face; and,
    a transition region between the end face and the pitch region, wherein at least one line or region of weakness is formed in the pitch region of at least one projection, to obtain a desired energy absorption characteristic.

2. The energy absorbing structure of claim 1, wherein the at least one projection comprises a plurality of lines of weakness.

3. The energy absorbing structure of claim 1, wherein the form of the at least one line of weakness is selected from the group consisting of a ridge in a surface of the pitch region, a continuous groove in a surface of the pitch region, a series of holes extending through the surface of the pitch region and a slot extending through the pitch region.

4. The energy absorbing structure of claim 3, wherein the form of the at least one line of weakness comprises a pattern of alternating grooves on both rear and front surfaces of a projection.

5. The energy-absorbing structure of claim 3, wherein the form of the at least one line of weakness comprises a continuous groove in a surface of the pitch region and wherein each groove has a depth of approximately one-tenth of the thickness of each projection.

6. The energy-absorbing structure of claim 1, further comprising at least one thinned region which defines at least one region of weakness.

7. The energy-absorbing structure of claim 6, wherein the at least one thinned region has a thickness less than half the thickness of the rest of the sheet.

8. The energy-absorbing structure of claim 1, wherein the at least one line or region of weakness in the pitch region encourages buckling in the pitch region as the respective projection deforms when absorbing impact energy.

9. The energy-absorbing structure of claim 8, wherein the at least one line of weakness substantially encircles the projection.

10. The energy-absorbing structure of claim 1, wherein the at least one line or region of weakness in the pitch region causes a plateau at a predetermined level in the stress-deformation curve upon energy absorption by the structure.

11. The energy-absorbing structure of claim 10, wherein the at least one line or region of weakness extends the plateau in the stress-deformation curve.

12. The energy-absorbing structure of claim 2, wherein the plurality of lines of weakness extend radially from a central axis of the at least one projection.

13. The energy-absorbing structure of claim 1, having a stress-deformation curve such that for increasing deformation, the stress rises to a peak and then falls away substantially until densification effects come into play.

14. A vehicle comprising an energy absorbing structure of claim 1.

* * * * *